3,217,361
STRETCHING MECHANISM FOR BLOWN FILMS
Daniel J. Ryan, Chester, and William H. Brown, Jr., Drexel Hill, Pa., assignors, by mesne assignments, to FMC Corporation, San Jose, Calif., a corporation of Delaware
Filed Jan. 30, 1963, Ser. No. 254,966
5 Claims. (Cl. 18—14)

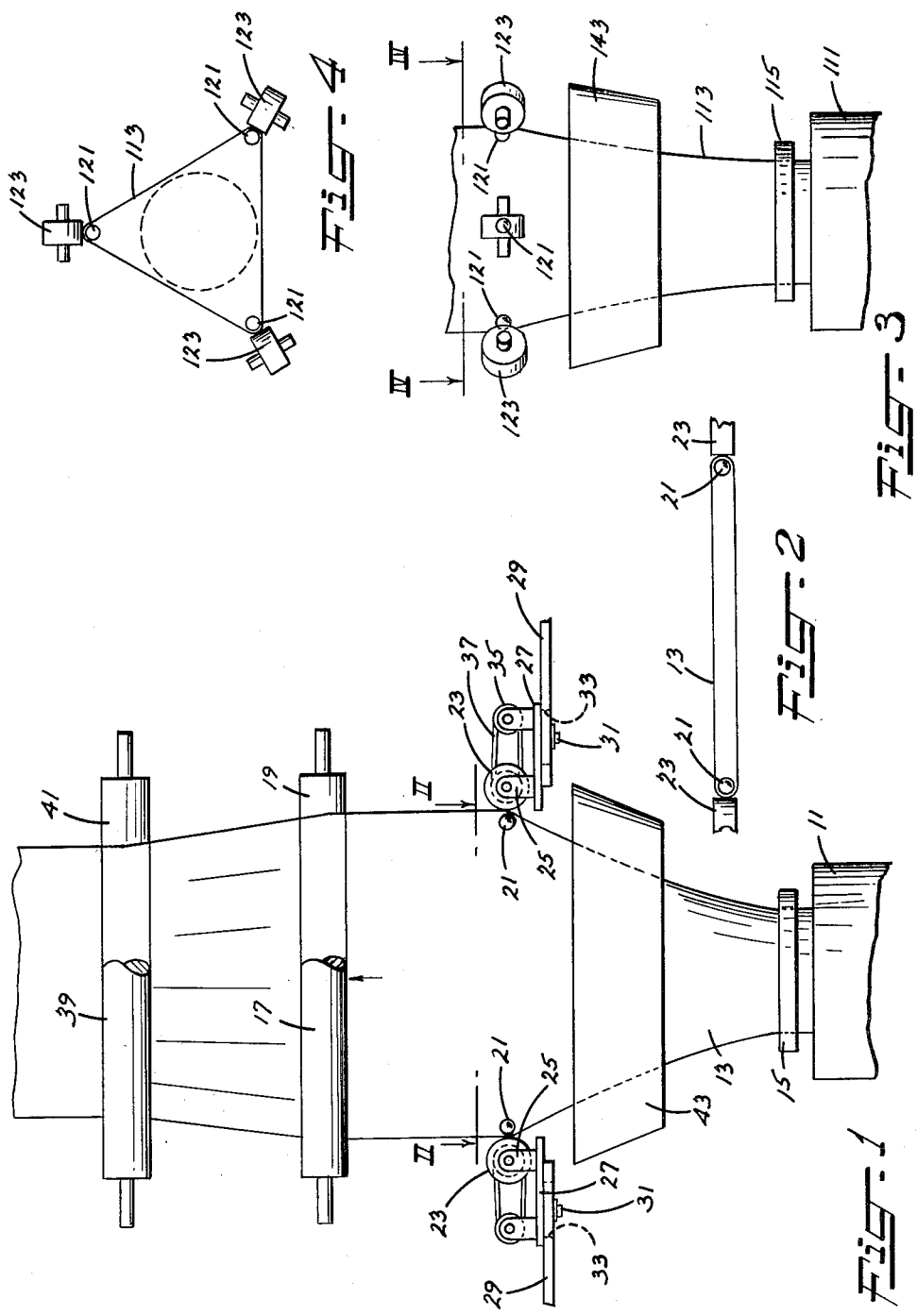

This invention relates to the manufacture of thermoplastic tubing, and more particularly to an improved apparatus for producing continuous seamless tubing from thermoplastic polymeric materials.

In one of the more common methods of manufacturing tubing, a molten thermoplastic material is extruded through an annular die in the form of a seamless tubing which is drawn from the die by wind-up rolls travelling at a speed at least equal to the rate at which thermoplastic material is extruded. Between the point of extrusion and the wind-up rolls the tubing may be inflated or expanded by mechanical means to a predetermined diameter. It has been found, however, that the inflating operation often provides a tubing having non-uniform lay-flat dimensions. On the other hand, when expanding a tubing with mechanical means, the portions of the tubing which are engaged with the expanding means may be advanced at a slower speed than the remainder of the tubing and may be expanded to different degrees so that the resulting product exhibits non-uniform properties. Accordingly, a primary object is to provide a new or generally improved and more satisfactory apparatus for manufacturing thin-wall plastic tubing.

Another object of an improved apparatus is stretching a tubing in a transverse direction during the manufacture thereof.

Still another object is the provision of an improved apparatus in which an extruded tubing is expanded from within by a plurality of members which are magnetically urged into spaced apart relationship.

Still further objects will appear from the following description.

The objects are accomplished in the present invention by an apparatus in which a plurality of members, formed of magnetizable material, are engaged with the internal surface of a freshly extruded continuous tubing, and then urged into spaced apart relationship by magnetic means located along the tubing path. At least one pair of take-up rolls is provided for advancing the extruded tubing away from an extrusion die and relative to such spaced members whereby stretching of the tubing in a transverse or lateral direction is effected continuously and concomitantly with its advancement. To facilitate substantially free longitudinal movement of the tubing during its expansion, the plurality of spaced members are preferably in the form of smooth-surfaced spheres or balls, while the magnetic means include magnetic rolls which are adapted to be adjusted substantially radially of the tubing axis.

The pair of take-up rolls employed may be driven at a speed which is equal to the rate at which the thermoplastic material is extruded or, alternatively, at a faster rate of speed so as to effect some longitudinal stretching of the tubing at this stage. The magnetic rolls may also be driven to assist the pair of take-up rolls in advancing and, if desired, longitudinally stretching the same. In applications where more than one pair of nip or take-up rolls are employed, the tubing may be stretched longitudinally independently of the transverse stretching thereof as the tubing travels between such pairs of take-up rolls.

In the drawing FIGURE 1 is a diagrammatic illustration of the apparatus of the present invention in use;

FIGURE 2 is a transverse section taken substantially along the line II—II of FIGURE 1;

FIGURE 3 is a view similar to FIGURE 1 illustrating a slightly different arrangement of the apparatus of the present invention; and FIGURE 4 is a transverse section taken substantially along the line IV—IV of FIGURE 3.

With reference to the drawing, FIGURE 1 diagrammatically illustrates an annular die 11 from which a molten thermoplastic polymeric material may be continuously extruded as a seamless thin-wall tubing 13. A ring 15 is provided for directing cool air or other gas against the extruded tubing 13 to at least partially set the same. The tubing 13 is continuously advanced away from the die 11 by a pair of nip or take-up rolls 17 and 19, and is stretched in a transverse or lateral direction, concomitantly with its advancement, by a pair of smooth surfaced spheres or balls 21 and cooperating magnetic rolls 23.

The balls 21 are formed of iron or other magnetizable material and are maintained engaged with the interior surface of the tube 13 by the magnetic influence exerted by the rolls 23, which may be either permanent magnets or electromagnets. The rolls 23 are each mounted between bearings 25 which project upwardly from individual carriages 27 disposed in diametrically opposed positions relative to the tubing 13. These carriages 27 are fixed to support plates 29 by bolts 31, with the plates 29 being provided with elongated slots 33 which permit movement of the bolts 31 and selective adjustment of the carriages 27 radially of the tubing axis.

A motor 35 is preferably provided on each of the carriages 27 for driving the respective rolls 23 through endless belts 37. The magnetic rolls 23 may be driven at a speed which is substantially equal to the rate at which the thermoplastic material is extruded or, alternatively, at a faster rate so as to effect some elongation of the tubing concomitantly with its advancement and transverse stretching.

Similarly, the take-up rolls 17 and 19 may be together driven at a faster rate of speed than the magnetic rolls 23 to effect a still further longitudinal stretching of the tubing. Preferably, however, the tubing is stretched in only a transverse direction as it is advanced away from the die 11, and is subsequently stretched longitudinally as it travels from the rotary nip rolls 17 and 19 to a second pair of nip rolls 39 and 41 driven at a faster rate of speed. Upon leaving the nip rolls 39 and 41, the stretched tubing is collected by suitable means, not shown.

As heretofore indicated, the freshly extruded tubing 13 is at least partially set by cool air or other gas delivered by the ring 15. When in such partially set condition, the tubing 13 is at a temperature which is above the softening range but below the melting point of the particular polymeric material from which the tubing is made. While in this condition, stretching of the tubing to provide a desired wall thickness and to effect orientation of the polymer molecules can be readily achieved. Additionally, the apparatus of the present invention includes an annular infra-red heater 43 which may be employed for heating or maintaining the tubing 13 at a desired temperature during the transverse stretching operation.

From the above description, it will be apparent that when the rolls 23 magnetically urge and maintain the balls 21 spaced apart a distance greater than the diameter of the extruded tubing, the tubing undergoes stretching in a transverse direction concomitantly with its advancement toward the nip rolls 17 and 19. In view of the smooth spherical configuration of the balls 21, such balls are adapted to turn or rotate under the influence of such advancing tubing. As a result, the contained balls 21 in no way mar the softened tubing or obstruct or retard its continuous and uniform travel. If desired, the balls and rolls may be coated with "Teflon" or other suitable material to minimize or eliminate any tendency for the tubing 13 to stick thereto.

The number of balls and cooperating magnetic rolls which are employed can, of course, be varied without departing from the scope of the present invention. Thus, as illustrated in FIGURES 3 and 4 three balls or spheres 121 and cooperating magnetic rolls 123 may be employed for stretching a continuous tubing 113 in a transverse direction concomitantly as such tubing is advanced away from a die 111, as by nip rolls, not shown. The tubing 113 is at least partially set by cool air or other gas delivered by a ring 115 and may be heated by an annular infra-red heater 143 prior to or during the transverse stretching operation. The balls 121 and magnetic rolls 123 correspond, in both structure and function, with the balls 21 and rolls 23 heretofore described. Along this line, it will be understood that the rolls 123 may be supported and driven in a manner as explained with reference to the rolls 23.

As illustrated in FIGURE 4, the balls 121 and the cooperating rolls 123 are positioned generally at the corners of an equilateral triangle and thereby subject the tubing 113 to less distortion during the transverse stretching operation than is occasioned with the arrangement shown in FIGURES 1 and 2. Further, by employing a greater number of balls 121, less magnetic influence need be exerted by each cooperating roll 123, and the contact which any one ball 121 makes with the internal surface of the tubing is reduced. Thus, in addition to minimizing distortion of the tubing, increasing the number of balls 121 which are employed generally permits smoother travel of the tubing and more uniform stretching thereof.

It is to be understood that changes and variations may be made without departing from the spirit and scope of the invention as defined in the appended claims.

We claim:

1. Apparatus for forming tubing of thermoplastic material including an annular die, means for continuously extruding heated thermoplastic material from the annular die in the form of tubing, means for advancing the tubing longitudinally away from the annular die, magnetic means positioned adjacent to the path of the tubing as it travels away from said annular die and to said advancing means, and a plurality of members formed of magnetizable material positioned to engage with the internal surface of the extruded tubing and are adapted to be urged away from each other by said magnetic means to thereby effect transverse stretching of the tubing concomitantly with its advancement, said members being of spherical shape to permit the same to rotate freely in response to forces applied by the tubing as it is transversely stretched and advanced relative thereto.

2. Apparatus for forming tubing of thermoplastic material including an annular die, means for continuously extruding heated thermoplastic material from the annular die in the form of tubing, a pair of rollers for together flattening the tubing as it travels therebetween, means for driving at least one of said rollers for advancing the tubing longitudinally away from said die, a plurality of spaced magnetic rolls positioned to engage with the outside surface of the tubing as it is advanced toward said rollers, a plurality of spherically shaped members formed of magnetizable material, said members maintained in engagement with the internal surface of the extruded tubing and by the magnetic influence of said rolls and adapted to be rotated by the movement of the advancing tubing itself, and means for moving said magnetic rolls radially of the axis of the tubing whereby the contained spherically shaped members are urged away from each other to thereby cause the tubing to be stretched in a transverse direction concomitantly with its advancement relative to said members.

3. Apparatus as defined in claim 2 wherein said magnetic rolls are idler rolls.

4. Apparatus as defined in claim 2 further including means for driving said magnetic rolls at substantially the same rate as said pair of rollers to assist in advancing the tubing.

5. Apparatus as defined in claim 2 further including a second pair of rollers between which the flattened tubing is adapted to travel and means for driving said second pair of rollers at a faster rate of speed than the first mentioned pair of rollers to thereby effect longitudinal stretching of the tubing.

References Cited by the Examiner

UNITED STATES PATENTS

| | | | |
|---|---|---|---|
| 2,433,937 | 1/1948 | Tornberg | 18—14 |
| 2,623,263 | 12/1952 | Dungler | 26—55 |
| 2,668,324 | 2/1954 | Johnson | 18—14 |
| 2,767,431 | 10/1956 | De Laubarede | 18—13 |
| 2,952,874 | 9/1960 | Doyle | 18—14 |

FOREIGN PATENTS

| | | |
|---|---|---|
| 431,619 | 7/1935 | Great Britain. |

WILLIAM J. STEPHENSON, *Primary Examiner.*